United States Patent [19]

Saaty et al.

[11] 4,069,948

[45] Jan. 24, 1978

[54] METHOD AND APPARATUS FOR CALIBRATING A REACTION INJECTION MOLDING MACHINE

[75] Inventors: Samir N. Saaty, Orange; Edward J. Thompson, Watertown, both of Conn.

[73] Assignee: The Upjohn Company, Kalamazoo, Mich.

[21] Appl. No.: 656,137

[22] Filed: Feb. 9, 1976

[51] Int. Cl.² .................. B67D 5/60; G01F 25/00
[52] U.S. Cl. ................................. 222/134; 73/3
[58] Field of Search ............... 222/134, 135, 145, 318; 73/3

[56] References Cited

U.S. PATENT DOCUMENTS 3,216,622  11/1965  Drostholm ...................... 222/135
3,306,495  2/1967  Wabers .......................... 222/318 X Primary Examiner—Stanley H. Tollberg
Assistant Examiner—Hadd S. Lane
Attorney, Agent, or Firm—St. Onge, Mayers, Steward & Reens

[57] ABSTRACT

A method and apparatus are disclosed for calibrating the individual amounts of each of several different reactive components separately recirculated in a closed loop system wherein separate portions of such components are periodically withdrawn from the system and intermixed in a mixing head of a reaction injection molding machine for delivery in homogeneously mixed condition to a closed mold under pressure. Calibrating means is provided to enable accurate monitoring and correction of the relative proportions of the reactive components delivered to the chamber of the mixing head, under actual operating pressure conditions prevailing during an actual injection molding operation, without substantially interrupting the molding process or requiring any dismantling of the apparatus to gain access to the individual component streams.

8 Claims, 2 Drawing Figures

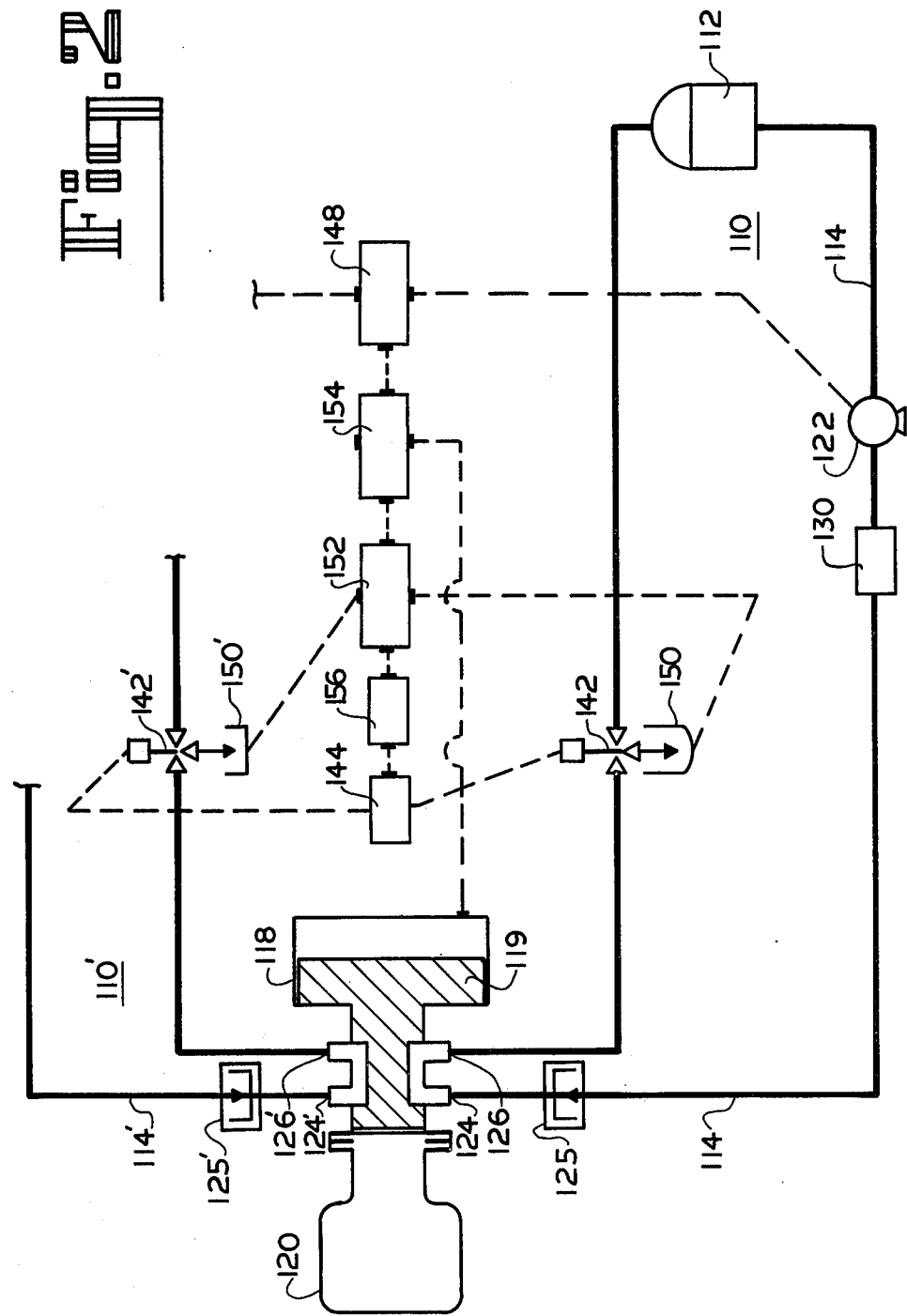

METHOD AND APPARATUS FOR CALIBRATING A REACTION INJECTION MOLDING MACHINE

BACKGROUND OF THE INVENTION

The present invention relates to a method and apparatus for calibrating a reaction injection molding machine to dispense each of a plurality of reactive components in proper proportion and thereby correctly mix a reactive molding material, all with minimum interrruption of normal production operation of the apparatus.

Reaction injection molding, also called liquid injection molding, is a technique for combining reactive liquid polymeric components and injecting them into a closed mold under pressure where they set to form a finished product. The component combination in, for example, a high density polyurethane foam formulation is achieved by directing streams of two or more reactive polymeric liquid components, each other high pressure, to cause their impingement at a common point in a mixing chamber of a mixing head. The resulting component impact creates a homogeneous mass of material in the mixing chamber which is then injected under pressure into a closed mold to which the mixing head is connected.

This reaction injection molding technique is distinguished from conventional plastic foam open molding technique in that a completely closed system is maintained for the components from withdrawal from their respective supply tanks to their injection in admixed condition into the closed molds. The technique permits formation of more intricate, delicate products, having narrow or thin sections that could not ordinarily be formed by conventional low pressure or open mold techniques; also it permits use of components of greater viscosity than is practical in the low pressure, open mold technique.

However, reaction injection molding systems have certain problems. Accurate metering of the reactive components is important to insure that these are combined in proper quantities, since slight variations in the polymer mix can result in defects in the finished product, causing rejection of such product. Moreover, the relatively high pressures used in reaction injection molding systems to obtain adequate mixing cause volume changes to occur in the system equipment during an injection cycle. These are due, for example, to component conduit or hose expansion and contraction arrising from pressure pulses at the start and termination of the injection cycle. This produces a condition known as "leading" or "lagging" of one component feed relative to another during the injection time interval, with resulting improper ratio of mixed components being introduced into the mold. When an aberation from the desired ratio of component mix in the finished molded product does occur, the physical properties of the finished product are adversely affected.

U.S. Pat. No. 3,551,974 (Jennings) discloses an apparatus for polyurethane molding that controls the rate at which the mold is filled. The apparatus includes individual flow meters that monitor the mass flow rate of each component as it is conducted to a mixing head. A signal proportional to the combined mass flow rate is generated by a circuit including tachometers connected to the flow meters, and is utilized to determine the rate at which polyurethane is deposited in the mold. The quantity of each component fed to the mixing head is not controlled to regulate the component mixture, however.

Still other prior art methods and apparatus attempt to measure the flow characteristics and properties of the reactive components at the mixing head. This approach however necessitates interrupting production of the products, since the mold must be disconnected from the head and the mixing head dismantled to gain access to the individual components for measurement of their respective flows. Furthermore, under such conditions, the flow will not be subject to the operating parameters of pressure, flow restrictions, etc., imposed during actual molding injection operations. Such approach therefore is not only expensive in terms of labor and time, but has inherent inaccuracies.

U.S. Pat. No. 3,608,001 (Kowalski et al) discloses a process for producing a polypropylene having a desired average molecular weight and molecular weight distribution in an extruder-reactor. The polypropylene is sampled to regulate the conditions in which its components react, without dismantling the mixing head, but only after combination of its components has already occurred. Again, therefore, no individual check of individual component feed rate is involved.

U.S. Pat. Nos. 3,499,387 (Zippel) and 3,788,337 (Breer) disclose other molding devices, but these also fail to disclose an apparatus or method of calibration wherein samples of individual component quantities are measured prior to mixing; and more especially there is no disclosure of sampling done under conditions simulating actual operating parameters.

SUMMARY OF THE INVENTION

In the preferred embodiments to be described below, the method and apparatus of the present invention are used to calibrate, under actual operating conditions, several different reaction injection molding machines, whereby to monitor the dispensing of each of a number of reactive polymeric components in proper proportion for combination in the mixing head chamber and subsequent injection into a closed mold. Calibration is accomplished without dismantling the molding machines and with only minimal interruption of production of molded products. Therefore, both time and labor are conserved. Moreover, the need to resort, as in prior systems, to continuous high pressure operation discussed above, with resultant high initial equipment cost and high operating expense is avoided.

The invention is applicable to either of the two common types of systems generally employed for determining the volume of charge of mixed components injected into a mold in a reaction injection machine. In one type, a metering cylinder and piston are utilized, while the other employs an axial type metering pump. There are further differences in the systems, as will be explained presently in greater detail; but in either case, the invention involves the incorporation of a three-way valve in the return line of each component duct system between the mixing head and the supply tank. These valves are ganged together for simultaneously operation by a suitable actuator to divert component fluid from its normal return path to the supply reservoir through an alternate path to a calibrated receiver. In the normal injection cycle of operation, the ganged calibration valves are positioned to return the respective components to the supply reservoir; but in the calibrate condition of operation of the system, these valves are positioned to return the respective components to separate calibrated receivers. In addition, during the calibration mode of operation, the control means of the mixing head is maintained in the recycle or non-inject condition. Under this set of conditions, the apparatus is actuated as though to run through a normal injection cycle, so that although the components are fed to the head and undergo the normal flow restrictions imposed therein, no mixing occurs and the components are separately returned from the head to the respective calibrated receivers. Thus an accurate measurement of the amount of each of the components introduced under normal operating conditions is readily determinable. Adjustments can then be made in the respective metering devices to alter the ratio and total amount of component amounts fed to the mixing head for admixture during a normal injection cycle.

Preferably, the control of the apparatus during transfer from normal injection cycle to calibration cycle operation is effected automatically on command by an override control which interrupts the production cycle by suppressing the injection operation and concurrently therewith diverting the three-way calibration valves from normal return position to calibration position. Automatic comparator means may be employed to measure the amounts of each of the components received in the calibration receivers, and to signal any deviation from a predetermined standard so as to effect a proportionate change in the respective metering devices of the system, whereby to bring the resulting admixture of components into conformity with the given standard.

Accordingly, it is an object of the present invention to provide a method and apparatus for quickly, economically and efficiently calibrating a reaction injection molding machine to dispense a predetermined amount of each of a plurality of reactive polymeric components during an injection cycle. Other objects, aspects and advantages of the present invention will be pointed out in, or will be understood from the following detailed description, when considered in conjunction with the accompanying drawings, which describe and illustrate the presently preferred modes of utilizing the invention.

BRIEF DESCRIPTION OF THE DRAWINGS

FIG. 2 is a diagrammatic representation of a modified reaction injection molding apparatus, similar to that shown in FIG. 1 but employing an alternate type of metering and injection pressurizing arrangement.

DESCRIPTION OF THE PREFERRED EMBODIMENTS

Figure 1:
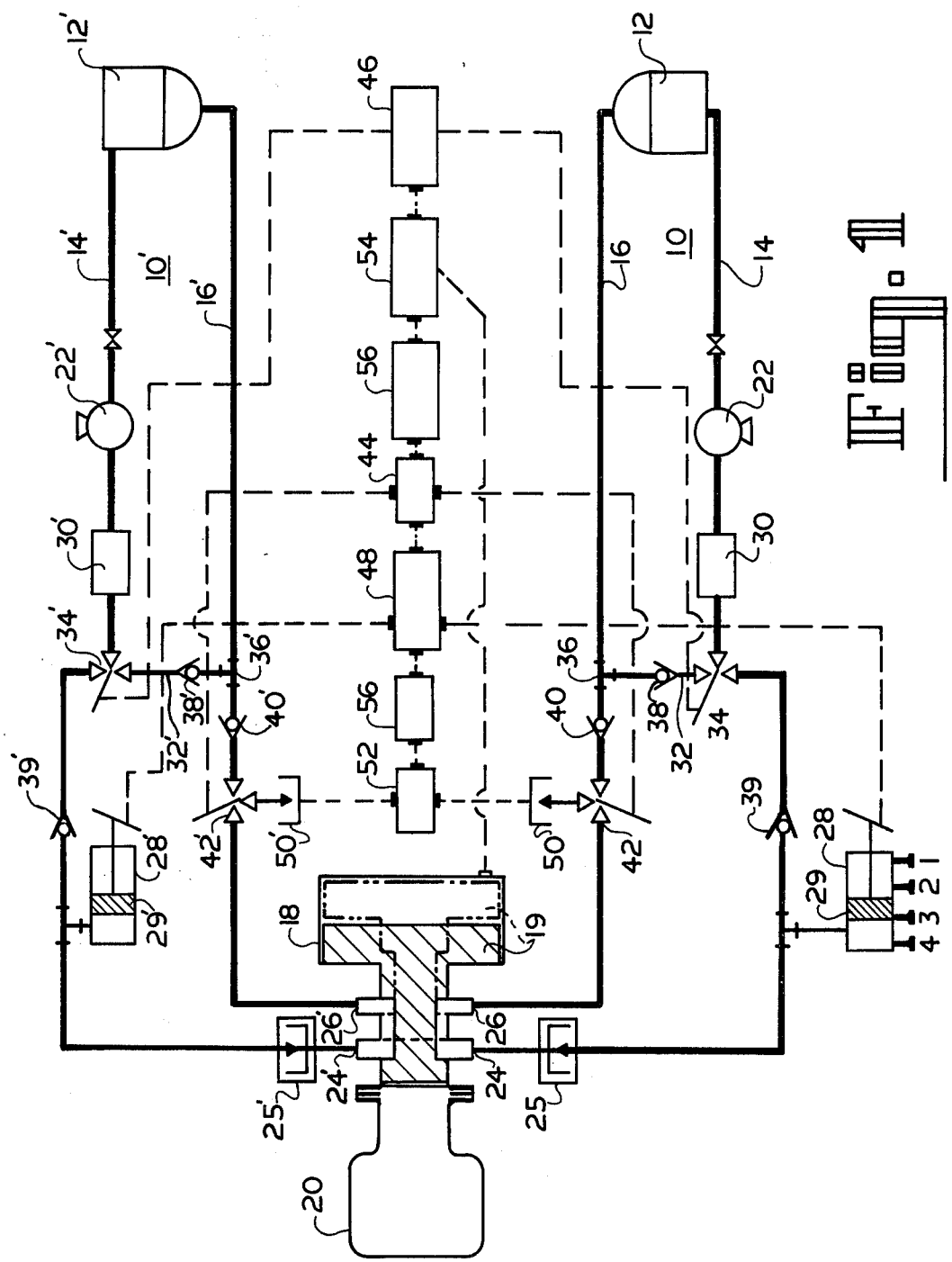
FIG. 1 is a diagrammatic representation of reaction injection molding apparatus for a two component system, in which the calibrated means of the present invention is incorporated.

FIG. 1 illustrates in diagrammatic form reaction injection molding apparatus with means for calibrating it in accordance with a first embodiment of the present invention. As shown, the apparatus is arranged to combine two reactive liquid components "A" and "B" to form an admixture for injection into a closed mold where the admixture sets or polymerizes in the shape or configuration of the desired product. In the interest of simplicity, the system here described combines only two components; however it will be apparent that it can be adapted to accommodate as many separate components as may be required for a particular molding composition and operation. Each component is transported in a closed loop system in the apparatus, and since these loops are identical, the description of one will suffice for an understanding of them all. Component loop or circuit 10, for handling component A, includes a reservoir or supply tank 12, a feed duct 14 and a return duct 16, both ducts communicating with tank 12. These ducts also communicate with a mixing head 18 having a control piston 19 adapted to control recirculation of individual components or injection of an admixed reactive polymeric foam under high pressure (in excess of 2000 – 2500 psi) into a closed mold 20 having the configuration of the desired finished product. A feed pump 22 is connected in duct 14 to supply liquid component from tank 12 to an inlet port 24 of mixing head 18, with return duct 16 making connection to the head at the outlet port 26. This pump operates at a substantially lower pressure than the injection operating pressure in head 18. The high injection pressure is developed in the head during the injection cycle by a high pressure metering cylinder 28 and piston 29 tapped into duct 14 to put the cylinder in parallel with the mixing head.

The system further includes a heat exchanger 30 in feed duct 14 between pump 22 and metering cylinder 28, in order to control the temperature of the component delivered to head 18.

The recirculation or return route from pump 22 through head 18 to tank 12 is shortened, under certain conditions to be explained presently, by a bypass or shunting duct 32. This bypass makes connection to a 3-way valve 34 positioned between heat exchanger 30 and metering cylinder 28 in feed duct 14, and a Tee connection 36 in return duct 16. A check valve 38 is disposed in shunt duct 32, a second check valve 40 is disposed in return duct 16 between Tee 36 and head 18, and a third check valve 39 is disposed between valve 34 and metering piston 28.

So much of the system is standard in prior apparatus.

The system of this invention includes a second 3-way valve 42, hereinafter referred to as the calibration valve, disposed in return duct 16 between head 18 and check valve 40. Calibration valve 42 is ganged through a suitable actuator 44 to the corresponding calibration valve 42' disposed in circuit 10' of component B. Shunting valve 34 is similarly ganged to valve 34' through a suitable actuator 46, while metering pistons 29, 29' are likewise ganged through an actuator 48.

In normal operation of the system described, shunt valves 34, 34' are positioned to route all fluid delivered through heat exchangers 30, 30' to the inlet ports 24, 24' of head 18. Calibration valves 42, 42' are normally disposed in non-calibrate position to direct all fluids returned from head 18 back to tanks 12, 12' respectively.

With pump 22 operating, under normal injection cycle condition, components A and B are delivered from the respective tanks through the heat exchangers to the metering cylinders and mixing head 18. Prior to initiation of an actual injection operation, control piston 19 of head 18 is disposed in the position shown in solid lines to return the respective components through ducts 16, 16' to tanks 12, 12'. Under this same condition, metering pistons 29, 29' are withdrawn to position "1" in the respective cylinders 28, 28', so that the cylinders are also full of the respective components. No flow takes place at this time through shunting ducts 32, 32'.

When it is desired to mix components A and B in mixing head 18 and to inject the resulting mixture into mold 20, shunting valve 34, 34' are actuated to their alternate position, whereby to divert all further pump output through the respective shunting ducts 32, 32'.

Check valves 38, 38' allow this flow to take place while check valves 40, 40' block flow in the direction of the mixing head, whereby all flow returns to respective tanks 12, 12' by the shortened recycled route through the bypass.

Concurrently, control piston 19 of the mixing head is retracted in timed sequence with actuation of metering pistons 29, 29' by actuator 48. Thus, after metering pistons 29, 29' move from positions "1" to "2" in cylinders 28, 28', respectively, as seen in FIG. 1, to stabilize the pressure in the systems, control piston 19 retracts to the dotted line position to initiate direct high velocity stream entry of components A and B to the mixing head chamber through the respective inlet port 24, 24', causing the streams to impinge into the mixing chamber of head 18 and thus achieve an intimate homogenization of the two components. The pressure for this intermixing is produced by continued travel of respective metering pistons 28 and 28' from positions "2" to "3," during which metered amounts of each components are introduced into the mixing head and injected into the mold. Such amounts are determined by the length of the stroke between positions "2" and "3" of the metering pistons, and adjustments may be made in the length of this stroke to alter the feed ratio and/or total amount of each component introduced into the head. Check valves 39, 39' protect valves 34, 34' from the high injection pressure.

When pistons 29, 29' reach piston "3," control piston 19 is actuated to cause return to its original (i.e., recycle) position. During this interval, continued travel of metering pistons 29, 29' from positions "3" to "4" serves to evacuate the metering cylinder of residual components, and this is accordingly recycled through head 18 in normal manner. Shunting valves 34, 34' are reversed to their original (i.e., non-bypassing) position, causing all flow thereafter to pass through the mixing head without mixing. Metering cylinders 28, 28' are refilled with fresh components as the metering pistons are withdrawn to their starting positions. This completes the normal injection cycle, and so much of the operation thus far described is standard in reaction injection molding equipment commercially available.

In accordance with this invention, calibration of the amount of the individual components, and/or the total amount of each of such components, delivered during an injection cycle is effected in the following manner.

At the start of the calibration cycle the system is in the normal recirculate condition described above, wherein shunting valves 34, 34', direct all of the components through the mixing head and back through calibrating valves 42, 42' to the respective supply tanks. With each of the component systems thus filled with components, the normal injection cycle is initiated by actuating shunt valves 34, 34' to bypass all further output of the respective pumps through the respective shunting ducts 32, 32', and back to the tanks. In this case, however, the normal actuation of control piston 19 of the mixing head is over-ridden so as to maintain that piston in its recirculate position. Now, however, calibration valves 42, 42' are actuated simultaneously by actuator 44 in timed sequence with the operation of metering pistons 29, 29' so as to interrupt the return flows from the mixing head to the respective tanks at the points in the travel of pistons 29, 29', where they respectively reach positions "2" in the metering cylinders. In this condition, further flow of the components from head 18 is diverted to measuring or calibrating receivers 50, 50'. This condition is maintained until metering pistons 29, 29' arrive at positions "3" in the respective metering cylinders, whereupon calibration valves 42, 42' are returned to their original position to divert all subsequent flow to the respective tanks. Thus, an accurate measure of the amount of each individual component actually dispensed by the system during a normal injection cycle will be indicated in receivers 50, 50'.

The calibration cycle is completed by continued advance of metering pistons 29, 29' to their respective positions "4" to exhaust residuals of the components from the metering cylinders back into the return duct 16, 16', after which shunting valves 34, 34' are again actuated to produce normal, recycle circulation of components through the mixing head, refilling metering cylinders 28, 28' with fresh material on retraction of the respective metering pistons.

It will be apparent from the foregoing that during the calibration cycle, actual operating parameters obtaining in the system during a normal injection cycle are fully duplicated, so that minute variations in the systems caused by pressure surges, hose swelling, structural deflections and the like are accurate replications of the conditions obtaining during an actual injection cycle. Thus comparison of the metered amounts of components in the calibration receivers is fully representative of the amounts delivered during the normal injection operation.

The system just described is readily adapted to fully automated operation using standard control devices commercially available. Thus a comparator 52 may be employed to sense the respective amounts of each component in the calibration receivers in order to give both a ratio signal as well as an indication of the absolute weights or volumes of each component. By feeding such signals to an adjusting control device 56, both ratio of the amounts of components within the mix, and total amount of mixed charge delivered during an injection cycle, may be controlled through suitable feed back circuits connected with actuator 48. Similarly, the timed operation of actuator 44 of calibration valve 42, 42' is coordinated with actuator 48 of the metering piston, and with mixing head control 54 operating control piston 19 in the mixing head. An override control 56 bypasses the normal control of piston 19 during a calibration cycle, as mentioned above, so as to maintain the control piston in its recycle or non-inject position in the head during calibration.

A modified system is illustrated in FIG. 2, in which the main difference from the system just described is the utilization of an axial type high pressure metering pump which functionally combines the low pressure circulating pump and high pressure metering cylinder piston arrangement of the previously described system. Such axial type metering pumps are well known and have a capability of delivering fluid output under uniform high pressure in accurately metered amounts, as required during the injection cycle. Because of this, considerable simplification of the normal reaction injection molding system is made possible, as will be apparent from the flow diagram of FIG. 2. Still, the same problem of calibration exists in systems of this type, since again the system is comprised of completely closed loops which prevent access to convenient measurement of the individual component flows under actual injection operating conditions. This, however, can be accomplished by using the concept of the invention here disclosed, as further described below.

At the start of a normal injection cycle in modified circuit 110 (of which circuit 110' is again an exact duplicate), pump 122 delivers component A to the inlet port 124 of head 118 through a backpressure adjusting valve 125, and component A is recirculated through return port 126 to the supply reservoir 112 by return duct 116.

At the start of an injection operation, control piston 119 of the mixing head is shifted by actuator 154, to its retracted position, allowing the streams of respective components to enter the mixing chamber of the head and to impinge against each other and become intermixed. The amount of component mixture entering the head is again controlled by a controller 148 with which actuator 154 is also coordinated. Injection is completed on return of control piston 119 to its original, recirculate, position so that the components again return separately without admixture to their respective supply tanks.

In order to calibrate this system, calibration control 144 signals control piston override 156, causing piston 119 to remain in its recirculate position; but now, calibration valve 142 (and its counterpart 142') is activated by controller 144 to shift to the alternate position. In this condition, all return flow from the head is then diverted to calibration receivers 150, 150' respectively, during the injection period determined by controller 148. Thereafter, the calibration valves are returned to normal, recirculate position. The several calibration receivers thus contain an accurate replication of the amounts of the respective components delivered to and mixed in the mixing head during a normal injection. Basis is thus provided to comparator 152 for making changes in individual component volumes to change the mixture ratio, or to modify the amount of each component to change the total amount of injected material. Automation of the controls using conventional controller means may be provided as previously discussed, to maintain a given or desired ratio, and/or total volume; or to produce changes in these to meet different operating conditions.

Although specific embodiments of the invention have been disclosed in detail above, it is to be understood that these are for purposes of illustration. This disclosure should therefore not be construed as limiting the scope of the invention, since changes may be made in the described structure and to the described method by those skilled in the art in order to adapt these calibration methods and apparatus to particular applications without departing from the scope of the following claims.

What is claimed is:

1. In a closed loop reaction injection molding system for combining under high pressure at least two reactive liquid polymeric components and injecting them into a closed mold, wherein said system comprises for each component to be admixed a supply reservoir; a pump for pumping each component from said reservoir; a mixing head having sets of inlet and outlet ports equal in number to the number of components, said head further having injection/recirculate means shiftable therein between component recirculation and injection positions and an injection port exposed in the injection position of said injection/recirculate means for connecting said mixing head to a closed mold; means for controlling the shifting of said injection/recirculate means; volumetric metering and pressurizing means comprising a metering cylinder and piston assembly for each component; a feed duct into which said last means is tapped to connect it between said reservoir and pump and said mixing head inlet port; and a return duct connecting said metering head outlet port to said reservoir; the improvement which comprises:
a calibration valve disposed in each of said return ducts and conditioned normally to direct all component flow back to the respective reservoirs but shiftable to an alternate flow-diverting condition;
a calibration receiver associated with each calibration valve to receive diverted flow from said valve;
means ganging said calibration valves together for simultaneous shift from normal to diverted flow conditions, and actuator means to produce said shift;
means for overriding said mixing head control, upon initiation in the system of an injection cycle, to prevent said mixing head injection/recirculate means being shifted to injection position, while simultaneously actuating said volumetric metering and pressurizing means and said calibration valve actuator means, to thereby cause the amount of each separate component discharged into its respective calibration receiver to be equal to that present in the admixture of said components ejected at the injection port of the head during a normal injection cycle;
a bypass valve in the feed duct of each component between said pump and said metering assembly tap, said bypass valve having a first position allowing component to pass from said pump to said metering assembly and to said mixing head, said bypass valve having an alternate position diverting all flow therethrough;
a bypass duct connected to receive the diverted flow from said bypass valve and to return it to said return duct between said calibration valve and supply reservoir without passing through said mixing head and calibration valve;
means ganging all of said bypass valves together for simultaneous operation; and
control means for coordinating the shifting of said bypass valves with said other control means to provide a shortened component recirculation route during a calibration cycle.

2. Calibration means for a reaction injection molding system as defined in claim 1, which further includes comparator means for comparing the amounts of the respective components received in said calibration receivers and to produce a signal whenever the amounts of such components are not in predetermined ratio to each other, or the total amounts thereof differ from a predetermined amount.

3. In a closed loop reaction injection molding system for combining under high pressure at least two reactive liquid polymeric components and injecting them into a closed mold, wherein said system comprises for each component to be admixed a supply reservoir; a mixing head having sets of inlet and outlet ports equal in number to the number of components, said head further having injection/recirculate means shiftable therein between component recirculation and injection positions and an injection port exposed in the injection position of said injection/recirculate means for connecting said mixing head to a closed mold; means for controlling the shifting of said injection/recirculate means; volumetric metering and pressurizing means comprising a high pressure axial type pump for conducting and metering each component from said reservoir; a feed duct connecting said last means between said reservoir and said mixing head inlet port; and a return duct connecting said metering head outlet port to said reservoir; the improvement which comprises:

a calibration valve disposed in each of said return ducts and conditioned normally to direct all component flow back to the respective reservoirs but shiftable to an alternate flowdiverting condition;

a calibration receiver associated with each calibration valve to receive diverted flow from said valve;

means ganging said calibration valves together for simultaneous shift from normal to diverted flow conditions, and actuator means to produce said shift;

means for overriding said mixing head control, upon initiation in the system of an injection cycle, to prevent said mixing head injection/recirculate means being shifted to injection position, while simultaneously actuating said volumetric metering and pressurizing means and said calibration valve actuator means, to thereby cause the amount of each separate component discharged into its respective calibration receiver to be equal to that present in the admixture of said components ejected at the injection port of the head during a normal injection cycle; and means for coordinating operation of said calibration valve ganging and actuator means and said axial flow pumps.

4. Calibration means for a reaction injection molding system as defined in claim 3, which further includes comparator means for comparing the amounts of the respective components received in said calibration receivers and to produce a signal whenever the amounts of such components are not in predetermined ratio to each other, or the total amounts thereof differ from a predetermined amount.

5. A method of calibrating a closed loop reaction injection molding system for combining under high pressure at least two reactive liquid polymeric components and injecting them into a closed mold, wherein said system comprises for each component to be admixed a supply reservoir; a pump for pumping each component from said reservoir; a mixing head having sets of inlet and outlet ports equal in number to the number of components, said head further having injection/recirculate means shiftable between component recirculation and injection positions, and an injection port exposed in the injection position of said head injection/recirculate means for connecting said mixing head to a closed mold; means for controlling the shifting of said injection/recirculate means; volumetric metering and pressurizing means comprising a metering cylinder and piston assembly; a feed duct into which said last means is tapped to connect it between said reservoir and pump and said mixing head inlet port; a return duct connecting said metering head outlet port to said reservoir; a bypass valve in the feed duct of each component between said pump and metering assembly tap, said bypass valve having a first position allowing component to pass from said pump to said metering assembly and to said mixing head, said bypass valve having an alternate position diverting all flow therethrough; and a bypass duct connected to receive the diverted flow from said bypass valve and to return it to said return duct between said calibration valve and supply reservoir without passing through said mixing head and calibration valve, and means ganging all of said bypass valves together for simultaneous operation; the improvement in said method which comprises the steps of:

utilizing a calibration valve, disposed in each of said return ducts and conditioned normally to direct all component flow back to the respective reservoirs, to simultaneously divert all return flow away from said return ducts into calibration receivers for each of said components, overriding the control of said mixing head injection/recirculate means to maintain it in recirculate position while coordinating the actuation of said volumetric metering and pressurizing means with shift of said calibration valves and further coordinating the shift of said bypass valves with the shift of said calibration valves to cause the amount of each separate component diverted to its respective calibration receiver to be equal to that present in the admixture of said components ejected at the injection port of the head during a normal injection cycle; and collecting such metered amounts of components in said calibration receivers.

6. In the method as defined in claim 5, the step which comprises comparing the diverted components received in said calibration receivers and producing a signal whenever the amounts of such components are not in predetermined weight or volumetric ratio to each other, or the total amounts thereof differ from a predetermined amount.

7. The method of calibrating a closed loop reaction injection molding system for combining under high pressure at least two reactive liquid polymeric components and injecting them into a closed mold, wherein said system comprises for each component to be admixed a supply reservoir; a mixing head having sets of inlet and outlet ports equal in number to the number of components, said head further having injection/recirculate means shiftable between component recirculation and injection positions, and an injection port exposed in the injection position of said head injection/recirculate means for connecting said mixing head to a closed mold; means for controlling the shifting of said injection/recirculate means; volumetric metering and pressurizing means comprising a high pressure axial type pump for conducting and metering each component from said reservoir; a feed duct connecting said last means between said reservoir and said mixing head inlet port; and a return duct connecting said metering head outlet port to said reservoir; the improvement in said method which comprises the steps of:

utilizing a calibration valve, disposed in each of said return ducts and conditioned normally to direct all component flow back to the respective reservoirs, to simultaneously divert all return flow away from said return ducts into calibration receivers for each of said components, overriding the control of said mixing head injection/recirculate means to maintain it in recirculate position while coordinating the shift of said calibration valves to divert flow to the calibration receivers with operation of said axial type pumps to deliver metered amounts of each component as in a normal injection molding operation, and collecting such metered amounts of components in said calibration receivers, such metered amounts thereby being equal to that present in the admixture of said components ejected at the injection port of the head during a normal injection cycle.

8. In the method as defined in claim 7, the step which comprises comparing the diverted components received in said calibration receivers and producing a signal whenever the amounts of such components are not in predetermined weight or volumetric ratio to each other, or the total amounts thereof differ from a predetermined amount.

* * * * *